350-3.79 SR

XR 3,689,692

SEARCH ROOM

United State.. [15] 3,689,692

Chung-Sen Ih SUBSTITUTE FOR MISSING XR [45] Sept. 5, 1972

[54] SOUND RECORDS AND REPRODUCING APPARATUS

[72] Inventor: Charles Chung-Sen Ih, Trenton, N.J.

[73] Assignee: RCA Corporation

[22] Filed: Oct. 27, 1970

[21] Appl. No.: 84,355

[52] U.S. Cl. ........178/6.6 R, 178/6.7 A, 179/100.3 G

[51] Int. Cl. ..........................G11b 11/18, H04n 5/86

[58] Field of Search .........178/6.7 A, 6.6 TP, 5.4 BD; 179/100.3 B, 100.3 G; 346/74 ES, 77 E, 77 R; 340/173 TP

[56] References Cited

UNITED STATES PATENTS

| | | | |
|---|---|---|---|
| 3,210,466 | 10/1965 | Day | 178/6.6 TP |
| 3,335,219 | 8/1967 | Goldmark | 178/6.7 A |
| 3,583,804 | 6/1971 | Mueller | 178/5.4 BD |
| 3,535,413 | 10/1970 | Glenn | 340/74 ES |

*Primary Examiner*—Howard W. Britton
*Attorney*—Eugene M. Whitacre

[57] ABSTRACT

A sound record comprising a tape having a diffraction grating line pattern thereon, audio information being contained as width modulation of the diffraction grating pattern. Sound reproduction apparatus for use with the width modulated diffraction grating tape comprises a light source formed into a narrow beam of light and focused across the width of the tape. A light sensitive detector is disposed to receive diffracted light from the tape. Diffracted light from the tape corresponding to the audio information is focused onto the light detector for producing electrical signals corresponding to the audio information.

17 Claims, 8 Drawing Figures

Figure 1A:
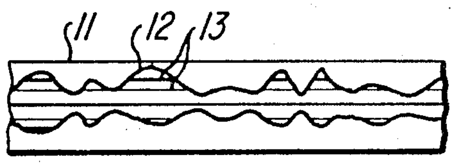

INVENTOR.
Charles S. Ih
BY Paul J. Rasmussen
ATTORNEY

INVENTOR.
Charles S. Ih
BY Paul J. Rasmussen
ATTORNEY

SOUND RECORDS AND REPRODUCING APPARATUS

BACKGROUND OF THE INVENTION

This invention relates to a sound record and sound reproducing apparatus and, more particularly, to a sound record having an embossed diffraction grating pattern width modulated in accordance with audio information.

Sound recordings are available in several common forms. One comprises a record in flat disc form having a spiral groove modulated in width and depth corresponding to sound; another, a tape having sound stored magnetically thereon, and another, a sound track disposed adjacent picture frames on film. The latter type of sound track may be a magnetic recording or an optical recording utilizing variable area or variable density format. There are several disadvantages present in most of the sound records and sound reproducing apparatus presently available. For example, optical sound recording such as on motion picture films are limited in resolution because of the grain structure of the film. Magnetic tape sound records require playback apparatus including magnetic heads which must be replaced periodically. Also, care must be taken that the magnetic records are not subjected to various magnetic fields which will undesirably degrade or erase the information stored on the tape. One problem encountered in all of the sound recordings described above is that of cost. Particularly with regard to prerecorded mass-produced records, it is highly desirable to have a permanent sound record which is easily stored and handled, resists wear and tear and is inexpensive to produce.

In copending patent application, Ser. No. 509,100, filed Nov. 22, 1965 by Hendrik J. Gerritsen and David F. Greenaway and entitled "HOLOGRAPH RECORD PRESSINGS" a record of a hologram is described. Particularly, the application discloses how a hologram may be made on a deformable medium and how a metal master may be made from the original hologram record. This metal master may then be used to impress the hologram onto other deformable material for making mass-produced, inexpensive duplicate record pressings.

An advantageous method of making duplicates of optical or sound recordings is disclosed in copending patent application, Ser. No. 862,019, filed Sept. 29, 1969 by Nathan Feldstein and entitled "METHOD OF MAKING DUPLICATES OF OPTICAL OR SOUND RECORDINGS". In this application it is described how a surface relief pattern in an organic plastic material is transferred to a metal form by sensitizing and activating the plastic surface, depositing a thin layer of nickel or cobalt thereon using a catalytic deposition process, backing up the thin metal layer with a heavier electrolytic deposit and separating the nickel or cobalt surface from the plastic surface and using the metal replica to mold or press duplicate copies in a deformable plastic.

The techniques described in the two above-mentioned copending applications are useful in that they can be utilized for making a metal master of a relief pattern, which master may then be used for the mass production of duplicate recordings.

It is an object of this invention to provide a sound recording utilizing a tape having an embossed diffraction grating pattern width modulated in accordance with audio information.

Another object of this invention is to provide sound reproducing apparatus which may be utilized with a tape having a diffraction grating pattern width modulated in accordance with audio information.

In accordance with the invention a sound record is provided comprising a tape having audio information contained thereon as width modulation of a diffraction grating pattern.

A system is provided for producing electrical signals corresponding to audio information contained on a tape as width modulation of a diffraction grating pattern. Optical means image light source as relatively narrow elongated beam onto a plane across which the tape is moved. The light beam is diffracted by the tape and is focused onto a light sensitive detector for producing electrical signals corresponding to the audio information contained on the tape.

Figure 1B:
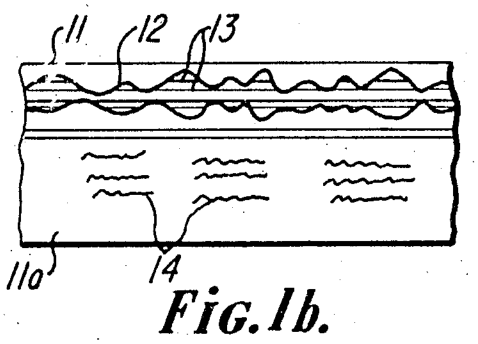
Figures 2A, 2B, 2C:
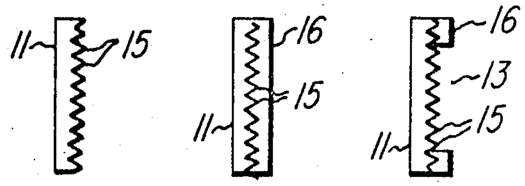
Figures 3A, 3B:
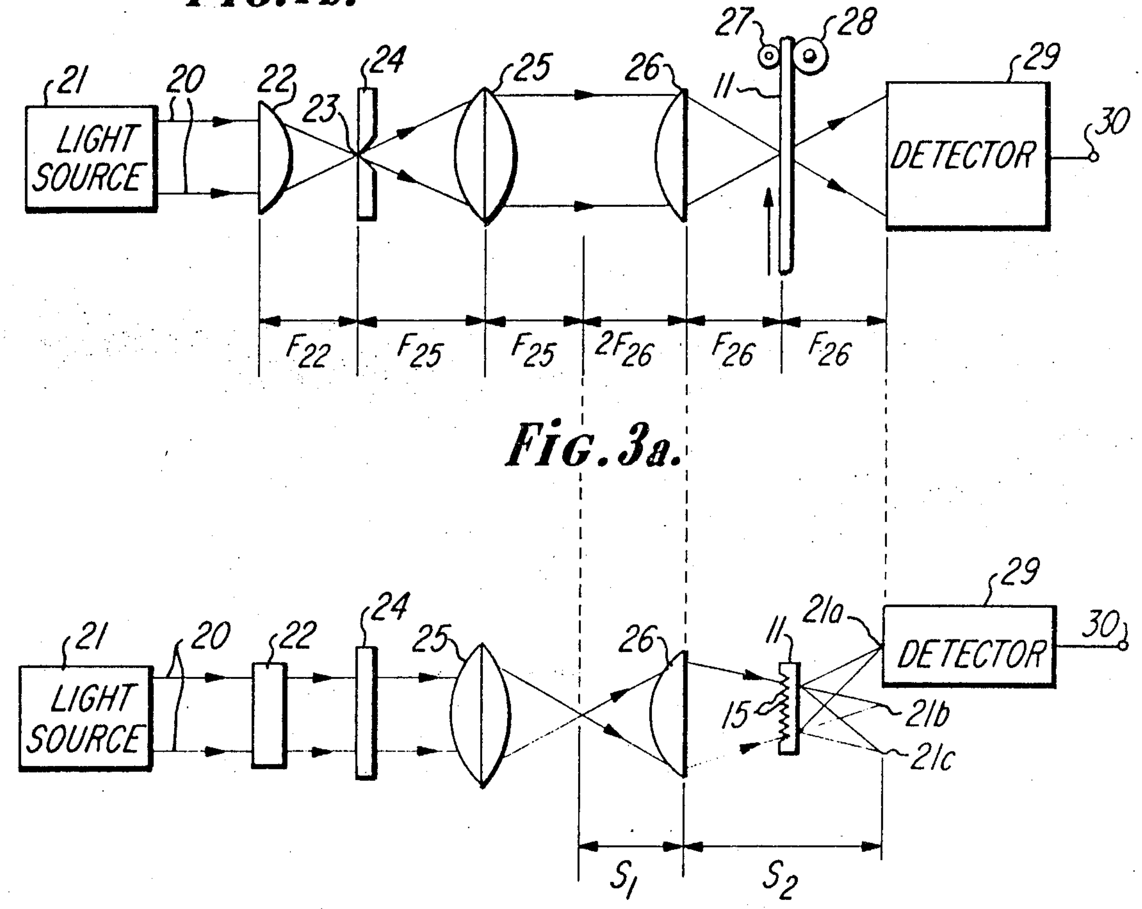
Figure 4:
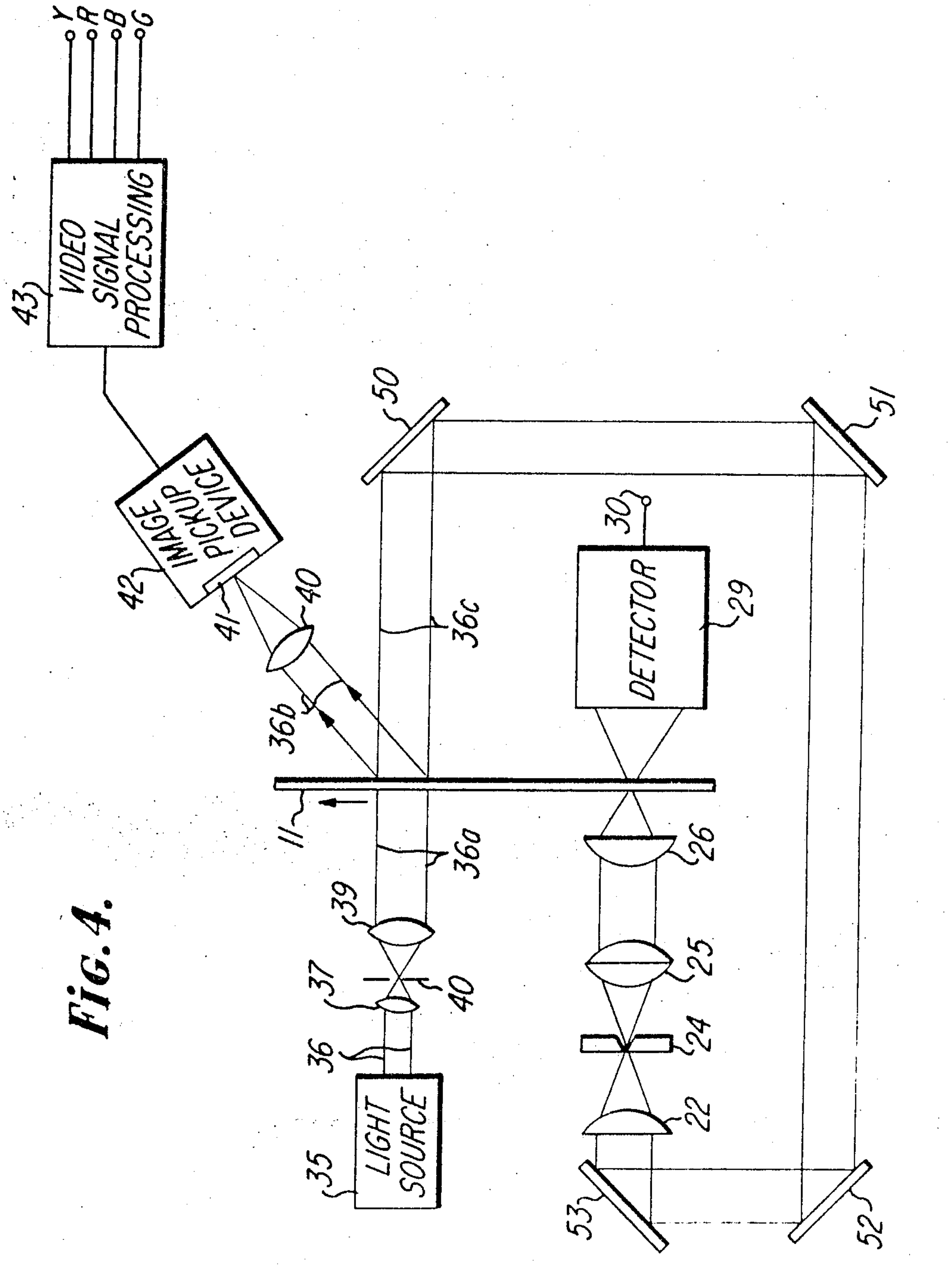

A more detailed description of the invention is given in the following specification and accompanying drawings of which:

FIGS. 1*a* and 1*b* illustrate two forms of the sound record embodying the invention;

FIGS. 2*a*, 2*b* and 2*c* are cross-sectional views illustrating the tape shown in FIG. 1a at various stages of manufacture;

FIGS. 3*a* and 3*b* show top and side views, respectively, of a system for producing electrical signals from the tape shown in FIG. 1*a*; and FIG. 4 shows a system for producing electrical signals from the tape shown in FIG. 1*b*.

DESCRIPTION OF THE INVENTION

FIG. 1*a* illustrates one form of a sound record embodying the invention. A transparent tape 11 such as a relatively thin milar or acetate tape includes a diffraction grating pattern having lines 13 which run longitudinally of the tape. An envelope 12 defines width modulation of the grating pattern lines 13. The width modulation is representative of audio information. It should be noted that the sound record 11 may comprise more than one width modulated sound track.

FIG. 1*b* illustrates another form a sound track record embodying the invention may take. Tape 11 contains a diffraction pattern line structure 13 which is width modulated by audio signal representative envelope 12 similar to the tape shown in FIG. 1*a*. However, in FIG. 1*b* the tape 11 is disposed adjacent a tape portion 11*a*. Tape portion 11a contains a series of embossed video information segments 14 which may be holographic in form. Thus, in FIG. 1*b* the sound track embodying the invention may readily be utilized as the accompanying sound track of a video information tape. An example of such a video tape in an embossed holographic form is described in the copending Gerritsen and Greenaway application mentioned above.

FIGS. 2*a*, 2*b* and 2*c* are cross-sectional views illustrating the tape shown in FIG. 1a at various stages of manufacture. FIG. 2*a* shows a plastic or acetate tape 11 having lines 15 of a diffraction grating pattern contained thereon. Such a diffraction grating pattern may be made on the tape by pressing the tape through a grating drum as is known in the art. The line density of the grating pattern in a direction normal to the length of the lines 15 may be in the order of 10,000 cycles per inch, for example. However, the line density figure is not critical and any line density which provides diffracted light beams the separate orders of which are suitably separated for selective detection is suitable. A blazed grating i.e., one having different slopes for the two sides of each grating line, is desirable in that it can be selected to diffract most of the light impinging upon the grating to a selected order beam thus increasing the useful efficiency of the grating.

FIG. 2b illustrates the grating tape shown in FIG. 2a with the addition of a photoresist coating 16 forming a layer on top of the grating line 15 portion of the tape 11. The photoresist may be similar to the photoresist known as AZ–1350 marketed by the Shipley Company.

The tape with photoresist layer shown in FIG. 2b is in the form in which the sound information is put on the tape. Generally, the sound information impinges on the tape in the form of a width modulated light beam. Any suitable process may be utilized to transfer sound information to the photoresist side of the tape. For example, sound may be conveyed to the tape by contact printing through the sound track of a motion picture film. In this method light passed by the motion picture film sound track exposes the photoresist layer of the tape and upon suitable development the tape 11 will contain a replica of the motion picture film sound track.

FIG. 2c illustrates the sound record containing the sound information. The sound information is contained within the area 13 defined by a width modulated envelope 16. Only that portion of the photoresist which was exposed to the sound pattern has been removed by the development of the photoresist, leaving the tape with the width modulated diffraction pattern corresponding to the audio information. The portions of the sound record not exposed to sound information still contain the photoresist such as shown by the boundary portion 16 in FIG. 2c.

Photoresist has a resolution greater than 1 micron and since light can be focused quite readily to about 1 micron, it may be desirable to expose the photoresist directly by a sound modulated light beam rather than by contact printing. Under these circumstances, the high resolution characteristic of the photoresist material may be utilized for recording sound having a relatively large bandwidth compared to the approximate 7.5 KHz bandwidth of motion picture film, the bandwidth of the film being limited by the relatively low resolution of the film due to its grain structure. It has been determined that a sound bandwidth greater than 15 KHz may be readily contained in the sound track according to the invention with the tape moving at a 7.5 inch-per-second rate.

After suitable exposure and development of the sound track, a metal master may be made of the sound track in a manner described in the copending Gerritsen and Greenaway application or the Feldstein application. The metal master may then be utilized to emboss the sound representative width modulated diffraction grating pattern onto any suitable surface such as a thermoplastic tape. In this manner, inexpensive high quality mass-produced tapes may readily be made.

The FIGS. 3a and 3b show top and side views respectively of a system for producing electrical signals from the sound record shown in FIG. 1a. In FIG. 3a, light rays 20 from a light source 21 are directed to a cylindrical lens 22 which focuses the light onto an elongated slit aperture 23 in an aperture plate 24. In the view shown in FIG. 3a the slit 23 is shown as being perpendicular to the plane of the paper. The slit 23 may be in the order of several microns in width, the exact width being determined by the resolution requirements of the sound record. Light emerging from slit 23 passes through spherical lenses 25 and 26 which focus the relatively narrow beam of light across a sound record 11. Sound record 11 is similar to the sound record described in FIG. 1a. Sound record 11 is moved through the narrow beam of light by a suitable tape drive mechanism which may include a capstan 28 and a pinch roller 27. The narrow beam of light is diffracted by the longitudinal diffraction pattern grating lines contained on the tape 11.

As previously described, the diffraction grating may be a blazed grating selected for maximum transmission of light in a first order diffraction beam. Light detecting means 29 is disposed such as to intercept the first order diffraction beam. The light diffracted by the sound record 11 is amplitude modulated in accordance with audio information by the width modulation of the diffraction grating pattern. However, an electrical signal corresponding to the audio information and the amount of light impinging upon light detecting means 29 is obtained from an output terminal 30 of light detecting means 29. Light detecting means 29 may be, for example, a photocell. The electrical signals obtained from terminal 30 are suitable for application to an audio amplifier which in turn may be coupled to a sound loudspeaker for reproducing the sound coded on the tape 11.

FIG. 3b illustrates the operation of the optical portion of the sound reproducing apparatus in a plane normal to the plane view shown in FIG. 3a. In FIG. 3b light rays 20 from light source 21 are substantially unaltered in this plane view by the cylindrical lens 22. The light rays pass through aperture 23 of aperture plate 24 and are focused by spherical lenses 25 and 26 onto detector 29 after passing through sound record 11.

The light rays emerging from sound track 11 are shown as a first order beam 21a, a zero order beam 21b and a conjugate first order beam 21c. The blazed grating impressed upon sound record 11 is selected such that most of the light, in the order of 70 percent, is diffracted in the first order beam 21a. If desired, another detector similar to detector 29 could be placed to intercept the light from the conjugate first order beam 21c. However, the transmission of useful information contained in the light of beam 21c is relatively small so that it is satisfactory to utilize only a single detector 29 in most situations.

Referring to FIGS. 3a and 3b it can be seen that the lens arrangement according to the invention enables the narrow beam of light passing through the slit aperture 23 to be focused onto the sound track 11 for providing a high resolution readout beam for the recorded sound information. At the same time in a direction normal to the direction of the focused beam of light, the lens system serves to focus the diffracted rays onto the light sensitive detector 29, thus insuring maximum efficiency of detection of the diffracted light. The optical spacing of the various lens elements in relation to the other elements of the sound reproduction apparatus is indicated in FIG. 3*a* and 3*b* by the letter "*f*" indicating the focal length of the lens to which the subscript numeral applies. The distances $s_1$ and $s_2$ indicated in FIG. 3*b* are not limited to the corresponding focal lengths shown in FIG. 3*a;* $s_1$ and $s_2$ can be any practical ratio and are related by the following equation:

$$(1/s_1)+(1/s_2)=(1/f_{26})$$

Referring to FIG. 3*b* the position of detecting means 29 in a vertical direction is determined by the pitch of the diffraction grating lines and the wavelength of the light emitted by light source 29 as the position of the various orders of light diffracted by the grating of sound record 11 is determined by the wavelength of the illuminating beam. Light source 21 may be monochromatic coherent light such as emitted by a laser or light source 21 may comprise a source of white light such as emitted by a lamp having a tungsten filament. If a white light source 21 is utilized, detecting means 29 is positioned so that it detects the diffracted light having the greatest intensity within the spectrum of light emitted by the white light source. A light beam such as provided by a gallium arsenide laser or light emitting diode is preferable to a white light source in that such a light source having a power in the order of one milliwatt is sufficient for illuminating the sound track 11 whereas a tungsten filament white light bulb should have a power in the order of 5 watts.

FIG. 4 shows a system for producing electrical signals from the tape shown in FIG. 1*b*. As described above, the tape shown in FIG. 1*b* is impressed with coded video signals in holographic form in a portion of the tape adjacent to the sound track portion. A light source 35 emits a monochromatic coherent light beam 36 which is utilized for reconstructing the video images from the holographic pattern contained on tape 11. Light beam 36 is expanded by lenses 37 and 39 into an expanded beam 36*a*, aperture plate 38 having an aperture therein serves to spatially filter the light. The expanded beam 36*a* emerging from lens 40 is passed through the video portion of tape 11. Beam 36*a* is diffracted by the relief pattern on tape 11 and the desired order beam 36*b* containing the reconstructed video images is focused by a lens 40 onto a photosensitive electrode 41 of a suitable image pickup device 42. Image pickup device 42 may be a vidicon, for example. As the electrode beam in the vidicon is scanned over photosensitive electrode 41, a composite electrical signal representative of the video information is derived from the photosensitive electrode and coupled to video signal processing apparatus 43. Signals representative of the brightness and color contained in the composite video signal are obtained from the video signal processing circuit.

Light beam 36*c* emerging from the tape 11 is the unused zero order beam. This beam is directed by reflecting mirrors 50, 51, 52 and 53 into sound reproduction apparatus similar to sound reproducing apparatus described in conjunction with FIGS. 3*a* and 3*b*. As described above, the beam entering the sound reproducing apparatus is formed into a relatively narrow beam extending across the sound portion of tape 11. The desired diffraction order beam containing the sound modulation information is detected by detecting means 29 which produces an electrical signal corresponding to the audio information. It should be noted that the sound track portion of the tape 11 is recorded to correspond with the video portion of tape 11. In the event that the video playback apparatus uses an intermittent tape motion apparatus to move the tape such as is done in a motion picture film projector, the continuously recorded sound may still be continuously obtained in the manner as it is obtained in a motion picture sound film projector.

In the embodiment shown in FIG. 4, the light source for illuminating the sound track portion of the film is obtained from the same light source which illuminates the video portion of the tape. This eliminates the need for separate light sources for the video and audio portions of the tape record 11. Although it is possible to derive light from source 35 for illuminating the sound track portion of tape 11 directly from light source 35 by means of a beam splitter disposed in the path of beam 36, the embodiment shown utilizes the light of the unused zero order video information light beam, thus enabling a lower power light source 35 to be utilized.

The description of the invention refers to the sound record as being of transparent plastic material embossed with the width modulated diffraction grating line pattern. Thus, the tape is utilized as a transmission medium for the illuminating beam. This arrangement is desirable because such a transparent tape can be economically produced. However, it is to be understood that the embossed tape can be made with a reflective coating, in which case the illuminating light beam will be reflected and diffracted by the surface of the sound record. This arrangement would not change the operation of the sound system but would require a re-positioning of the light sensitive detecting means.

What is claimed is:

1. A recording, comprising an elongated tape having a diffraction grating formed on said tape, said grating comprises a plurality of parallel grooves of fixed depth and having a dimension of said grating in the direction of said tape width varied in accordance with information to be recorded.

2. A recording according to claim 1 wherein said tape is of a transparent material whereby upon illumination from one side said signal is contained in diffracted light emerging from the other side of said tape.

3. A recording according to claim 1 wherein said tape has a light reflecting coating whereby upon illumination from one side said signal is contained in diffracted light reflected from said one side.

4. A flexible transparent elongated tape including a record formed on one side thereof as width modulation of a diffraction grating, said grating comprises a plurality of parallel grooves of fixed depth of which extend longitudinally of said tape whereby upon being illuminated information corresponding to said width modulation is contained in diffracted light emerging from said tape.

5. A reproduction apparatus for playing back a record formed as width modulation of a diffraction grating extending along an elongated tape, said grating comprises a plurality of parallel grooves of fixed depth, comprising:

a source of light;

an aperture plate defining a relatively narrow slit aperture for passing light;

a cylindrical lens disposed between said light source and said aperture plate for focusing a beam of light on said slit aperture;

light detecting means for producing electrical signals corresponding to light impinging thereon; and means for focusing said light emerging from said slit aperture substantially to a plane along which said tape is moves and for focusing light diffracted by said record onto said light detecting means.

6. A reproduction apparatus for producing electrical signals corresponding to width modulation of a diffraction grating formed on an elongated tape, said grating comprises a plurality of parallel grooves of fixed depth, comprising:

a source of light for illuminating said tape;

means for moving said tape through said illuminating beam of light;

light detecting means disposed to intercept light diffracted by said tape; and means for forming and focusing a relatively narrow beam of light extending across said tape at substantially a right angle to the lines of said diffraction grating and for directing light diffracted by said tape onto said light detecting means for producing electrical signals corresponding to the width modulation of said tape.

7. A reproduction apparatus according to claim 6 wherein said means for forming a relatively narrow beam of light includes a cylindrical lens disposed between said light source and said tape.

8. A reproduction apparatus according to claim 7 wherein said means for focusing said light beam includes means for focusing said diffracted light onto said light detecting means.

9. A reproduction apparatus according to claim 8 wherein said light source produces essentially monochromatic coherent light.

10. A reproduction apparatus according to claim 8 wherein said light source produces white light.

11. The method of making an optical record, comprising:

imprinting a plastic tape with a diffraction grating, said grating comprises a plurality of parallel grooves of fixed depth;

depositing a layer of light sensitive material over said diffraction grating;

exposing said light sensitized tape to light modulated by information to be recorded;

processing said exposed light sensitive tape such that said light sensitive material is removed from said tape in the exposed areas;

producing a metal master of said processed tape; and producing a duplicate of said original sound record by forming a thermoplastic tape with said metal master whereby said thermoplastic tape with said metal master whereby said thermoplastic tape has said information contained as width modulation of said diffraction grating.

12 A system for producing electrical signals corresponding to video and sound information contained in a record, said sound information being contained in a portion of said record adjacent video portions and comprising width modulation of a diffraction grating, said grating comprises a plurality of parallel grooves of fixed depth, comprising:

a light source;

means for moving said record relative to said light source;

means for directing said light along a first path for illuminating video portions of said record whereby video information is contained in light diffracted by said record;

first detecting means for detecting said video modulated light for producing electrical signals corresponding to the video information contained in said record;

means for directing said light along a second path for illuminating said sound information portion of said record;

second detecting means disposed to intercept light diffracted by said sound information portion of said record; and means for forming and focusing a relatively narrow beam of light extending across said sound portion of said record at substantially a right angle to the plurality of parallel grooves of said diffraction grating and for directing light diffracted by said sound information portion of said record onto said second detecting means for producing electrical signals corresponding to the width modulation of said diffraction grating.

13. A system for producing electrical signals corresponding to video and sound information contained in a record according to claim 12 wherein:

said means for directing light along a second path includes means for directing light from an order of said light diffracted by said video information portion of said record, which order is other than the diffracted light directed to said first detecting means.

14. A system for producing electrical signals corresponding to video and sound information contained in a record according to claim 13 wherein said means for forming a relatively narrow beam of light includes a cylindrical lens disposed between said light source and said tape.

15. A system for producing electrical signals corresponding to video and sound information contained in a record according to claim 14 wherein said means for focusing said light beam includes means for focusing said diffracted light onto said second detecting means.

16. A system for producing electrical signals corresponding to video and sound information contained in a record according to claim 15 wherein said light source produces essentially monochromatic coherent light.

17. A system for producing electrical signals corresponding to video and sound information contained in a record according to claim 16 wherein said light source produces white light.

* * * * *